United States Patent Office 2,772,502
Patented Dec. 4, 1956

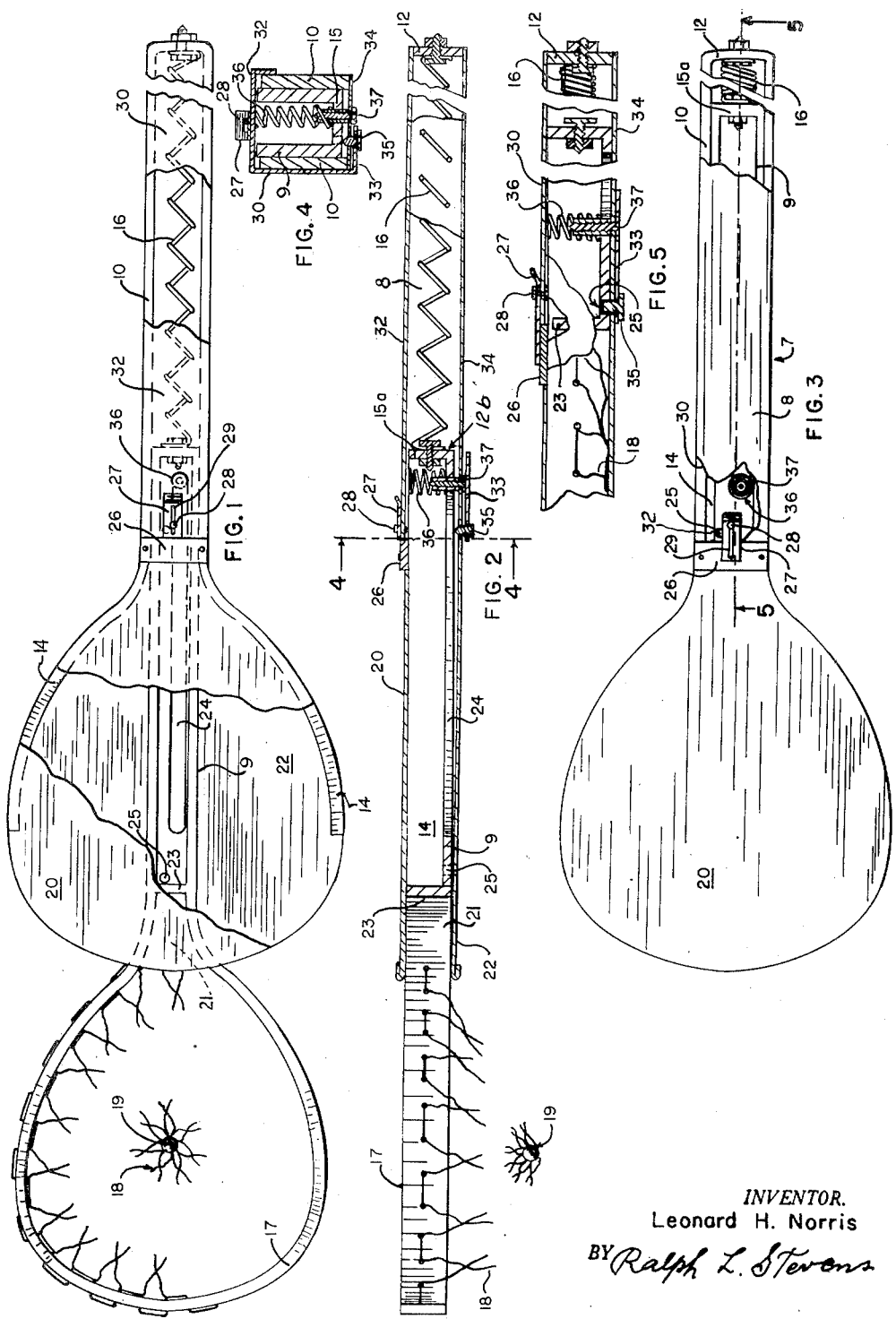

2,772,502

FISHERMAN'S ADJUSTABLE NET

Leonard H. Norris, Denver, Colo.

Application December 15, 1955, Serial No. 553,377

13 Claims. (Cl. 43—11)

This invention relates to fishermen's nets, especially those of the type that are designed to have the netting portion retractable to the handle so as to avoid entanglement with brush, briars and the like when not in actual use.

More particularly, the present invention involves a fish net construction in which the netting portion does not collapse, but has a retainer somewhat in the shape of a frying pan into which it can be recessed when not in use.

There have been prior proposals as to housed or retractable nets, but they have been impracticable for the reason that the netting portion would have to be collapsible and withdrawn into the handle or minor variations thereof, with insufficient housing room for a hoop (string holder) that is of adequate strength and yet collapsible. Also, there is the problem of rusting and friction to prevent prompt release.

It is the primary object of the present invention to devise a fishing net in which the netted portion is sturdy and retractable into a housing without change in shape.

A further important object is to so mount the threaded netting that it will not obstruct or clog the relatively movable parts when its holder is retracted.

Another major object of the invention is to provide a new and improved, and easily operable spring release mechanism as part of the net handle.

These and further objects should become readily apparent from a study of the following detailed description when taken in conjunction with the accompanying drawing, wherein:

Fig. 1 is a plan view of a preferred form of the invention, the device being in fully extended position for netting a fish;

Fig. 2 represents a vertical section taken substantially through the device of Fig. 1;

Fig. 3 shows the same device in fully collapsed position;

Fig. 4 represents an enlarged cross-section taken along line 4—4, Fig. 2; and

Fig. 5 is a vertical section taken substantially along line 5—5, Fig. 3.

With continued reference to the drawing, the numeral 7 indicates generally the entire handle structure comprising a primary handle or housing 8 adapted to slidably receive, in cylinder and piston fashion, an extension or secondary handle member 9 having an end portion 12b.

Handle 8 comprises an elongated U-shaped member forming side walls 10, bridged by an end portion 12 at the rear and extending forwardly to provide a pair of curved fingers 14 forming part of a nest, for a purpose presently seen.

The extension handle 9 is trough shaped, having a bottom 15 and a rear end wall 15ª. An elongated low tension coil spring 16 of, say 12" in length when free, can be compressed between members 12 and 15ª to a length of about 2". This is accomplished by pushing a net hoop 17, rearwardly from its position of Figs. 1 and 2 to that of Fig. 3. This hoop is integrally formed with the side walls of handle 9, and is shaped to move with a fairly snug fit into the nest provided by the fingers 14.

The hoop is supplied with a mesh net 18 which is connected centrally to a dense ring 19 that serves as a weight to distend the net and also to facilitate its entry into and discharge from the pan shaped housing device formed by the fingers 14 and a pair of parallel plates 20, 22 secured to the top and bottom edges of the latter in any suitable manner. The parts thus far described, except for the spring 16 and the net may be formed either of a light metal or sturdy plastic.

The plates of course are of such shape as to conform to the general outline of the hoop 17 and to fully close both sides of the latter when it is retracted (Figs. 3 and 5). It should be observed that no part of the hoop is deformed while it is being housed, and hence that it can have adequate strength for netting the largest fish that might be scooped from the water within the capacity of the net. Also, that no matter which side of the "pan" is up when it is released, the net falls downwardly, assisted by the weight 19. Upon return, the ring may be manipulated into a pocket 21 formed at the rear of the hoop and hence tends to flatten the net for free entry to the pan.

At the front end of handle extension 9 there is a transverse vertical plate 23 which serves three purposes, viz.: to prevent separation of the side members to which it is joined; to aid in forming the pocket 21 just mentioned; and to prevent the net from getting into the operating mechanism. The bottom of the extension has a hole 25 just behind this plate near one edge, and an elongated slot 24, for purposes about to be explained.

A horizontal transverse stop plate 26 crosses the tops of the front ends of the sides 10 of the primary handle, to brace the latter and to assist in a latching function, in cooperation with a slide bar 27 that is held by a pin 28 passed through its slot 29. The bar and pin are carried by a sleevelike sheath 30, that fits onto the primary handle, as follows:

Sheath 30 is substantially rectangular and comprises a flat top 32 covering the handle from its rear end to the plate 26; and which vertically overhangs and laps one side wall 10; and a short bottom wall 33 that is bent into such shape that it overlaps a sheet 34 that flatly covers the bottom of the handle, being secured thereto in any suitable manner. The distance between the forward end of the top of the sheath and its bottom part 33 is slightly greater than the depth of the two telescoped handle members so that there can be a horizontal clearance at either top or bottom, as shown, for a purpose now to be seen.

A pin 35 is screw-set into the parts 33 and 34 with its upper end positioned to extend into the hole 25 when the net is fully retracted. Fig. 5. This action becomes automatic by virtue of a small but relatively strong coil spring 36 compressed between part 32 and the bottom of the extension handle, where is is held in place by a second screw-set pin 37. The latter also serves as a stop to prevent the net proper and its handle from being shot out of the primary handle by the spring 16, the pin 37 being projected through slot 24 to engage the rear end of the slot at the moment the net reaches its operative position of Figs. 1 and 2.

The release action is accomplished simply by squeezing the forward portion of sheath 30—preferably by pressing with the thumb against top part 32—thus compressing spring 36 and withdrawing pin 35 from hole 25 and permitting spring 16 to expand.

The slide bar 27 is in effect a guard to prevent inadvertent or accidental release of spring 16 to perform the action just described. By sliding this guard element forwardly until it rides onto the plate 26 (Figs. 3 and 5)

the forward end of the sheath cannot be forced downwardly to disengage the pin 35 from the hole 25.

The operation and the important structural features should now be apparent from the foregoing running description. It should be observed that the stop device involves only two essential movements, and that no intricate mechanism is embodied. It can be cheaply manufactured and is reliable in use. The most important consideration is that the net and its holder can be completely housed without deformation of any of the sturdy parts. Obviously, when fishing where protection of the net mesh is unnecessary, upon removal of the pin 37 the secondary handle can be fully withdrawn from the primary handle to afford a somewhat conventional one-piece net complete in itself.

It should be understood that some variations and alterations may be made within the spirit of the invention, if made within the scope of the appended claims.

What is claimed is:

1. A fisherman's adjustable net device comprising a primary handle, a net proper having an extension handle having an end portion slidable into said primary handle, and a housing carried by said primary handle for substantially complete encasement of said net proper when retracted without change in shape of the latter.

2. In the structure defined in claim 1, a coil spring disposed longitudinally within said primary handle between said primary handle end portion and said extension handle end portion and arranged to be substantially completely compressed when said handles are fully telescoped and cooperative latching and release mechanism carried by said handles.

3. In the structure defined in claim 2, coactively associated stop means on said handles for preventing their complete separation, said stop means forming a part of the said cooperative latching and release mechanism.

4. In the structure defined in claim 1, said housing being in the form of a covered pan with a forward opening of sufficient size, and itself being of sufficient size to permit entry of said net proper, the latter having a hoop to complete the enclosure.

5. In a fisherman's net device, a primary handle comprising substantially parallel elongated elements provided with integral curved fingers at their forward ends; plates mounted on said fingers to provide a pan shaped receptacle; a secondary handle slidably fitted into said primary handle; a netted hoop carried by said secondary handle and designed to fit rather snugly within said receptacle; and mechanism including resilient means within the primary handle for pushing said secondary handle and its hoop forwardly into operative position.

6. In the structure defined in claim 5, a pin carried by said primary handle, and said secondary handle having a longitudinal slot receiving said pin, said slot so arranged that said pin acts as a stop to prevent separation of said handles.

7. In the structure defined in claim 5, said mechanism comprising a substantially complete compressible coil spring disposed within said primary handle and reacting between the rear ends of both handles.

8. In the structure defined in claim 5, said mechanism comprising spring means tending to separate said handles longitudinally, and releasable means for latching said handles together when said secondary handle is received by said primary handle, said releasable means comprising latching elements carried by said respective handles.

9. In the structure defined in claim 8, said latching elements comprising a pin in one handle, the other handle having a hole for reception of said pin, and said mechanism including spring means tending to extend said pin into said hole when they intercept each other.

10. In a fisherman's net device, comprising complementary units that fit together, and one of which may be extended from the other and adapted to carry a net; said units having telescoped handles one of which is a receptive handle for reception of the other; a compressible spring means tending to separate said handles longitudinally; a sheath substantially encompassing the receptive handle; said sheath embodying compressible parts movable by hand pressure; and complemental and cooperative parts carried by said sheath and said receptive handle and its counterpart to latch said handles together in telescoped position.

11. In the structure defined in claim 10, the receptive handle having a transverse stop means, and said sheath having means ridable into engagement with said stop means to maintain said net retracted.

12. In the structure defined in claim 11, an upright compressed spring between one side of said receptive handle and the opposite side of the other handle, to tend to force them apart.

13. A fish netting device comprising: a primary handle having forked curved fingers covered at top and bottom by plates to form a net housing; a secondary handle telescopically arranged with respect to the primary handle, a net hoop on said secondary handle and shaped to be received within and concealed by said net housing; said secondary handle having conformation to slide rather closely into said housing, when retracted.

References Cited in the file of this patent

UNITED STATES PATENTS 2,384,162     Finn _____ Sept. 4, 1945